(12) United States Patent
Ning

(10) Patent No.: US 10,935,761 B1
(45) Date of Patent: Mar. 2, 2021

(54) LARGE APERTURE COMPACT LENSES

(71) Applicant: Alex Ning, Carlsbad, CA (US)

(72) Inventor: Alex Ning, Carlsbad, CA (US)

( * ) Notice: Subject to any disclaimer, the term of this patent is extended or adjusted under 35 U.S.C. 154(b) by 239 days.

(21) Appl. No.: 16/356,133

(22) Filed: Mar. 18, 2019

Related U.S. Application Data

(60) Provisional application No. 62/646,697, filed on Mar. 22, 2018.

(51) Int. Cl.
| | | |
|---|---|---|
| *G02B 13/00* | (2006.01) | |
| *H04N 5/225* | (2006.01) | |
| *G02B 9/12* | (2006.01) | |
| *G02B 15/177* | (2006.01) | |
| *G02B 5/00* | (2006.01) | |

(52) U.S. Cl.
CPC ........... *G02B 13/0035* (2013.01); *G02B 9/12* (2013.01); *H04N 5/2254* (2013.01); *G02B 5/005* (2013.01); *G02B 13/0045* (2013.01); *G02B 15/177* (2013.01)

(58) Field of Classification Search
CPC .. G02B 13/0045; G02B 13/0035; G02B 9/12; G02B 5/005; G02B 15/177; H04N 5/2254
USPC .......................... 359/716, 740, 754, 784–792
See application file for complete search history.

(56) References Cited

U.S. PATENT DOCUMENTS

| | | | |
|---|---|---|---|
| 4,329,024 A | 5/1982 | Rogers | |
| 6,014,267 A * | 1/2000 | Tsurutani | ....... G02B 15/143507 359/689 |
| 7,023,628 B1 | 1/2006 | Ning | |
| 7,929,221 B2 | 4/2011 | Ning | |
| 7,940,478 B2 | 5/2011 | Take | |
| 8,503,110 B2 | 8/2013 | Oshita | |
| 8,659,841 B2 | 2/2014 | Enomoto | |
| 8,964,312 B2 | 2/2015 | Kawamura | |
| 10,324,307 B2 * | 6/2019 | Kim | ............... G02B 15/144113 |
| 2006/0056054 A1 * | 3/2006 | Kashiki | ................ G02B 15/177 359/689 |
| 2007/0285805 A1 * | 12/2007 | Lundgren | ............ G02B 15/177 359/784 |
| 2011/0115963 A1 | 5/2011 | Sueyoshi | |
| 2013/0094102 A1 * | 4/2013 | Baba | .................... G02B 13/001 359/784 |
| 2015/0205080 A1 | 7/2015 | Yokoyama | |
| 2017/0176721 A1 * | 6/2017 | Kim | ..................... G02B 27/646 |
| 2017/0184814 A1 * | 6/2017 | Ning | ....................... G02B 9/64 |

OTHER PUBLICATIONS

Langenbach, Eckhard, Athermal correction of optical systems, DGaO Proceedings 2013—http://www.dgao-proceedings.de-ISSN: 1614-8436-um: nbn: de: 0287-2013-A036-5.

\* cited by examiner

*Primary Examiner* — Evelyn A Lester

(74) *Attorney, Agent, or Firm* — Mark Winosky

(57) ABSTRACT

Large aperture compact lens and a camera design using the lens are described. The lens comprises from object to image, three lens groups with a first lens group having a negative or positive power and comprising 3-4 lens elements, a second lens group having positive power and 3-4 elements including an aperture stop, at least one cemented doublet and one positive power lens made from athermic optical material, and a third lens group comprising 1-3 elements.

13 Claims, 11 Drawing Sheets

LARGE APERTURE COMPACT LENSES

CROSS-REFERENCE TO RELATED APPLICATIONS

This application claims priority to U.S. Provisional Application 62/646,697, filed Mar. 22, 2018, titled Large Aperture Compact Lenses by the same inventor.

STATEMENT REGARDING FEDERALLY SPONSORED RESEARCH OR DEVELOPMENT

Not Applicable.

BACKGROUND OF THE INVENTION

Technical Field

The invention relates to large aperture lenses with field angles ranging from about 20 to 145 degrees and designed with excellent thermal stability.

Related Background Art

Digital imaging cameras use solid-state image sensors such as CCD or CMOS imagers to convert optical images into electronic signals. As the resolution of the imagers increases, there is a continuous need for optical lenses with increased performance. An important characteristic of the lens is the ability to produce high-resolution images across a wide field of view. Another important characteristic is to produce such high-resolution images using a lens that is of a compact size. The lenses are increasing being incorporated into a variety of electronic devices including not only mobile phones, cameras, sports cameras, computers and computer peripherals, but now also surveillance devices, vehicles, drones and other devices where the lenses and associated imaging system are used for real time guidance of vehicles and surveillance analyses. Incorporation of the lenses into new devices places new environmental performance requirements upon the lens. The lens must be compact and light, to be used in portable devices, and must still maintain high performance characteristics.

Optical systems used, for example, to provide automotive driver assistance and automated piloting of a variety of vehicles have placed new demands on optical lens design. Such optical systems must maintain optical performance in harsh environments where wide temperature excursions can be anticipated. Frequently such systems are fixed focus and require that the image focused on an optical sensor, and thus the back focal length, is maintained over wide temperature excursions. These lens systems also require designs that cover field angles from 20 to 145 degrees, be compact and must operate in low lighting conditions. There is a need for a lens design that provides high performance imaging lenses with low F-number (F/1.6 to F1.8) and field angle ranging from about 20 to 145 degrees with excellent thermal stability.

BRIEF SUMMARY OF THE INVENTION

The present invention comprises three lens groups counting from the object side to the image side (left to right in the following figures):
1) Group 1 has negative or positive power comprising 3-4 elements.
2) Group 2 has positive power comprising 3-4 elements. The aperture stop is either adjacent to this group or embedded in this group. This group comprises at least one cemented doublet. At least one of the positive powered elements in this group is made from a material having a negative dn/dT over the operating temperature range, where n is the index of refraction of the material at d-line (587.56 nm) and T is the temperature of the environment. Such material is known as "athermal optical material".
3) Group 3 comprises 1 to 3 elements.

One or more elements in Group 1 and 3 may be an aspherical element. An aspheric element is a lens element such that at least one of its two surfaces is described by a general aspheric equation as follows:

$$z = \frac{cr^2}{1+\sqrt{1-(1+k)c^2r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16}. \quad (1)$$

where z is the surface sag relative to the vertex of the surface. The variable r is the radial distance from the optical axis. The constant c is the curvature (inverse of radius) at the vertex of the surface. The constant k is known as "conic" constant. The other coefficients ($\alpha 1$, $\alpha 2$, ...) are the aspheric coefficients. Aspheric elements can be made from a suitable glass or plastic material. F is the effective focal length of the entire lens assembly. F1 is the effective focal length of group 1, F2 the effective focal length of group2, and F3 the effective focal length of group 3. The following conditions are satisfied:

$$2.8 < TTL/(ImageHeight*2) < 4.12 \quad (2)$$

Where TTL is the total track length defined as the distance from the front element vertex to the image plane when focused at infinity. ImageHeight is the chief ray height on the image plane at d-line.

In a preferred embodiment, the lens system is a fixed focus lens system.

The specific examples are not intended to limit the inventive concept to the example application. Other aspects and advantages of the invention will be apparent from the accompanying drawings and detailed description.

DETAILED DESCRIPTION OF THE INVENTION

FIGS. 1-10 show ten embodiments of the fovea lens designs. The Figures also serve as diagrams for the specific examples 1-10 listed and discussed below.

Figure 1:
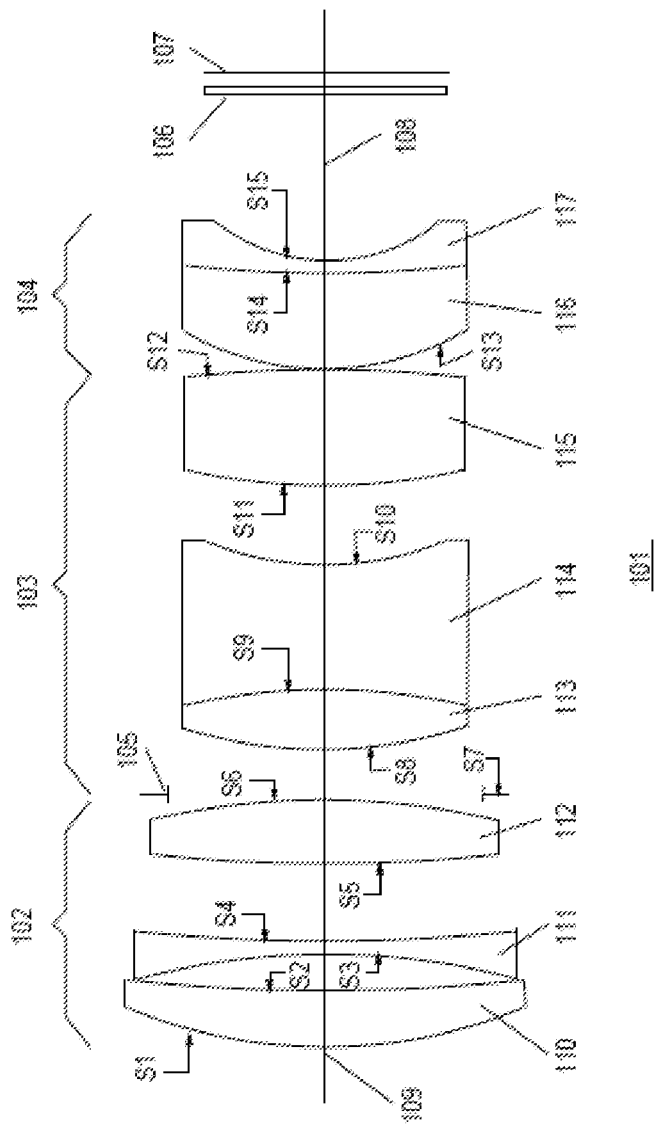
FIG. 1 is a diagram of a large aperture compact lens having 8 lens elements.

Referring to FIG. 1, the radius of curvature in all examples is measured at the point on the lens element 110-117 intersecting the optical axis 108 of the large aperture compact lens 101. The description of the lens elements as flat, convex or concave refers to the curvature at this point on the lens surface that intersects the optical axis. A lens surface may also be aspherical. The term lens refers to the lens 101 that is comprised of a plurality of lens elements 110-117. Each lens element by itself is also known in the literature as a lens. Here, lens refers to the multi-component system. The first exemplary embodiment of the invented large aperture compact lens is shown in FIG. 1. This design has a field angle of 24 degrees with a relative aperture of F/1.6. The lens 101 is comprised of eight lens elements 110-117 centered about the optical axis 108 from object end 109 to image 107. The lens is divided into three lens groups 102, 103, 104. The first lens group 102 nearest the object end 109 is comprised of three standard lens elements 110-112. Both the object surfaces S1, S3 and S5 and the image surfaces S2, S4 and S6 are spherical. The second lens group 103 comprises, in this embodiment, aperture stop 105 and spherical lens elements including a cemented doublet 113, 114 and lens element 115 having surfaces S8-S12. Lens element 113 is made from athermal optical material. The third lens group 104 comprises cemented doublet 116, 117 having surfaces S13-S15. In a camera formed from this lens design an image sensor is located at the image plane 107 and optical filter 106 is interposed between lens element 117 and the image plane 107. A specific example of a lens made according to FIG. 1 is listed below as Example 1. In one embodiment the optical elements of the lens consist solely of the eight lens elements 110-117 as shown. The general form of the description including numbering of lens surfaces from object S1 to image S15 is used in the descriptions of all embodiments of FIGS. 2-10. As such all surfaces are not numbered in subsequent Figures but follow the same, well known, scheme.

Figure 2:
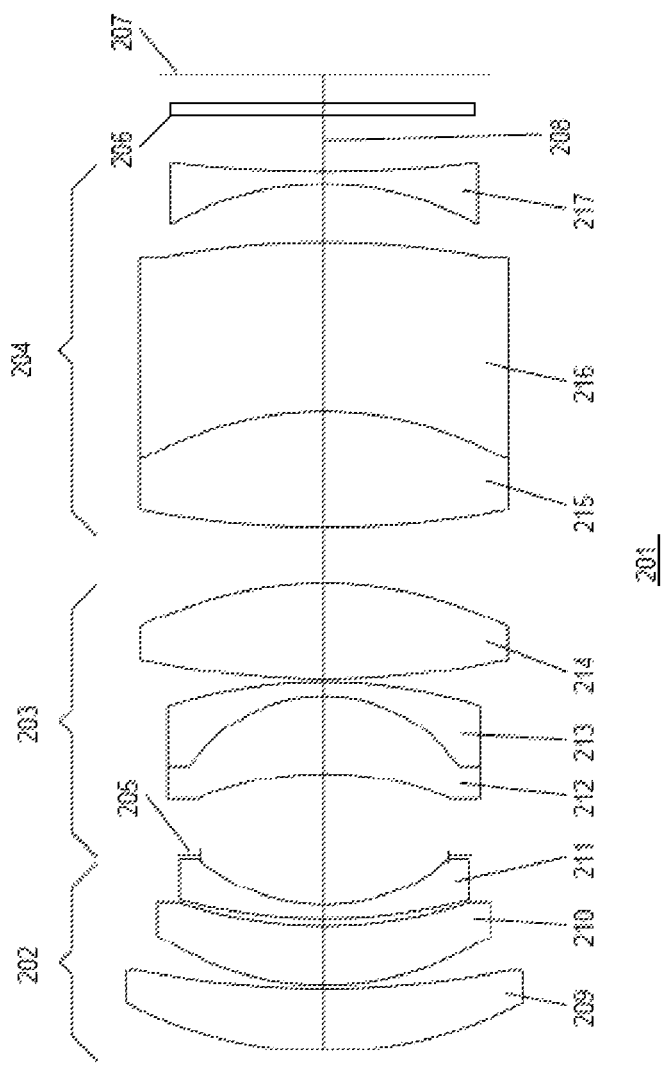
FIG. 2 is a diagram of a large aperture compact lens having 9 lens elements.

FIG. 2 shows a large aperture compact lens design 201 that includes 9 optical elements 209-217, each aligned about and along the optical axis 208. This design has a field angle of 34 degrees with a relative aperture of F/1.6. The lens elements are divided into three lens groups. The first lens group 202 includes lens elements 209, 210 and 211 and all are spherical. The second lens group 203 includes aperture stop 205 and spherical lens elements including a cemented doublet 212, 213 and lens element 214. Lens element 214 is made from athermal optical material. The third lens group comprises spherical lens elements including a cemented doublet 215, 216 and lens element 217. A filter 206 is shown in the design between the third lens group 204 and the image plane 207. In one embodiment the large aperture compact lens 201 of FIG. 2 consists solely of the lens elements as shown. In another embodiment additional lens elements may be added to the design. However, the lens 201 with just the lens elements 209-214, as shown, satisfies the parametric equation 2. A specific example of a lens made with the design of FIG. 2 is shown below as Example 2.

Figure 3:
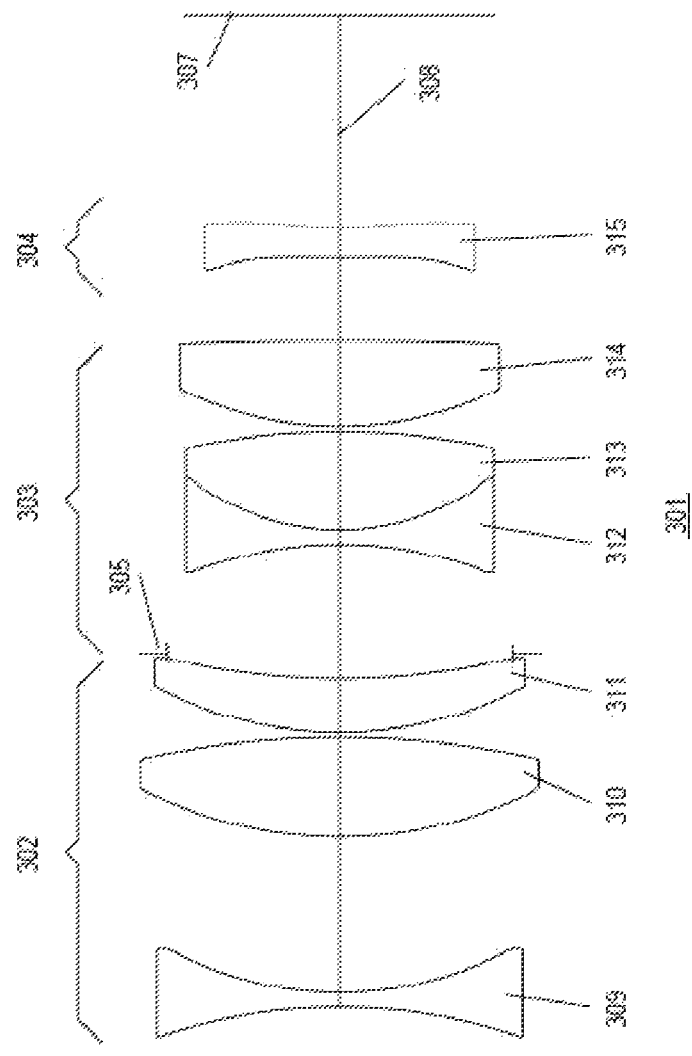
FIG. 3 is a diagram of a large aperture compact lens having 7 lens elements.

FIG. 3 shows a large aperture compact lens design 301 that includes 7 optical elements 309-315, each centered on and precisely spaced along the optical axis 308. This design has a field angle of 50 degrees with a relative aperture of F/1.6. The lens elements are divided into three lens groups. The first lens group 302 includes spherical lens elements 309-311. The second lens group 303 includes aperture stop 305 and three spherical lens elements 312-314. Lens elements 312, 313 are a cemented doublet and lens element 314 is made from athermal optical material. The third lens group 304 and includes aspheric lens element 315. Both surfaces (S13 and S14) are aspheric. A filter 306 is shown in the design between the third lens group 304 and the image plane 307. In one embodiment the large aperture compact lens 301 of FIG. 3 consists solely of the lens elements as shown. In another embodiment additional lens elements may be added to the design. However, the lens 301 with just the lens elements 309-315, as shown, satisfies the parametric equation 2. A specific example of a lens made with the design of FIG. 3 is shown below as Example 3.

Figure 4:
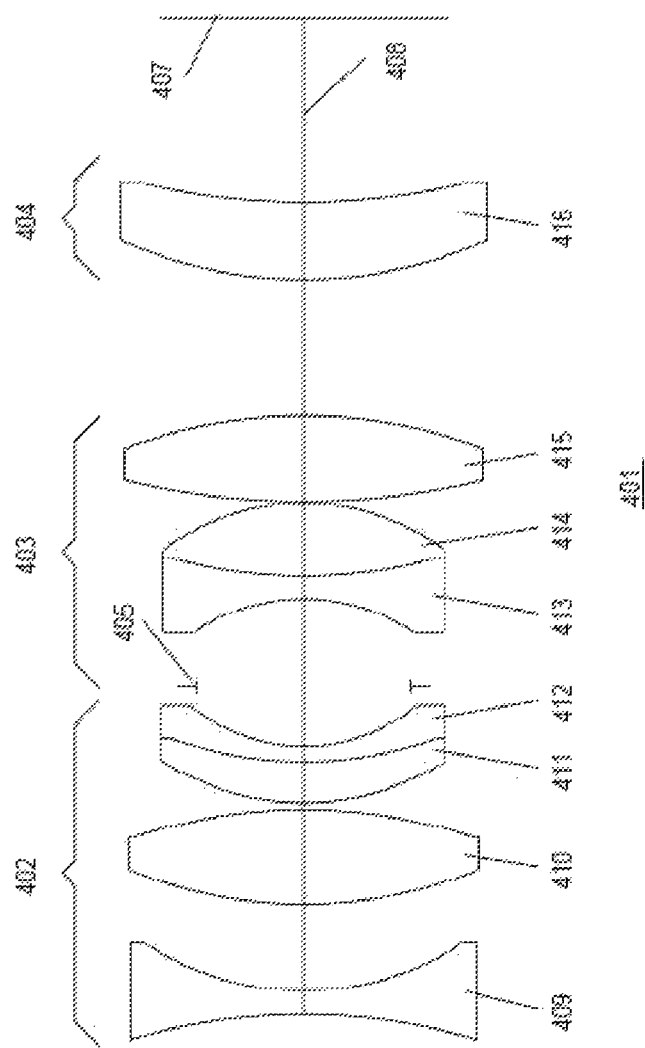
FIG. 4 is a diagram of a second large aperture compact lens having 8 lens elements.

FIG. 4 shows a large aperture compact lens design 401 that includes 8 optical elements 409-416, each centered on and precisely spaced along the optical axis 408. This design has a field angle of 56 degrees with a relative aperture of F/1.6. The lens elements are divided into three lens groups. The first lens group 402 includes spherical lens elements 409, 410 and cemented doublet 411, 412. The second lens group 403 includes aperture stop 405, cemented doublet 413, 414 and lens element 415 which is made of athermal optical material. The third lens group 404 includes lens element 416. In one embodiment the large aperture compact lens 401 of FIG. 4 consists solely of the lens elements as shown. In another embodiment additional lens elements may be added to the design. However, the lens 401, with just the lens elements 409-416, as shown, satisfies the parametric equation 2. A specific example of a lens made with the design of FIG. 4 is shown below as Example 4.

Figure 5:
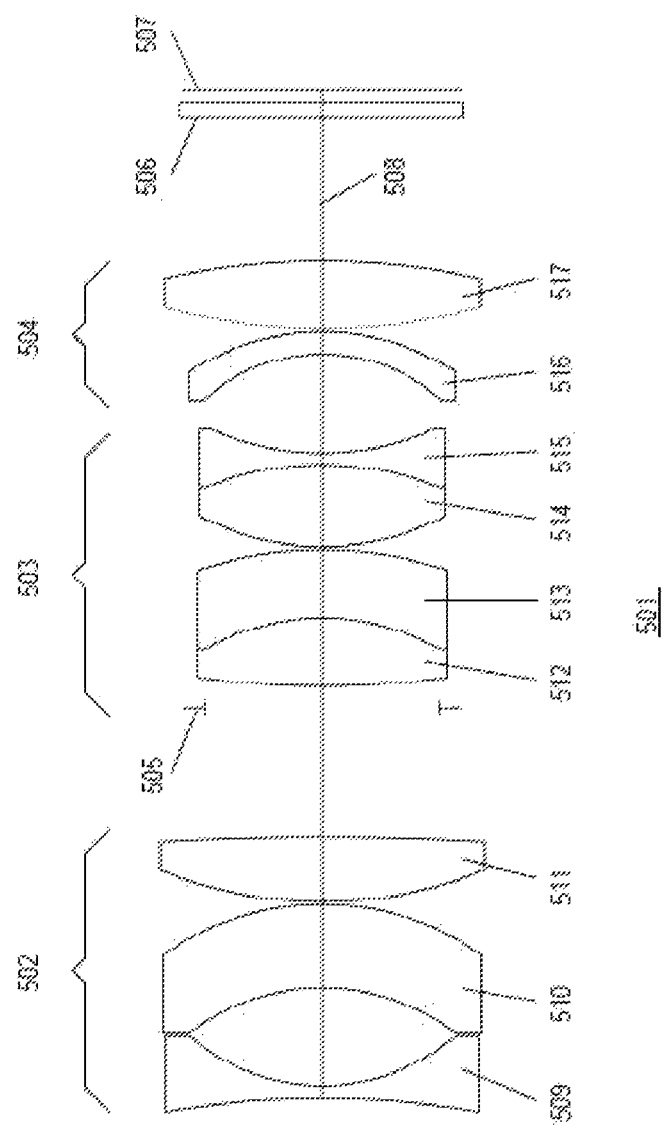
FIG. 5 is a diagram of a second large aperture compact lens having 9 lens elements.

FIG. 5 shows a large aperture compact lens design 501 that includes 9 optical elements 509-517, each centered on and precisely spaced along the optical axis 508. This design has a field angle of 74 degrees with a relative aperture of F/1.6. The lens elements are divided into three lens groups. The first lens group 502 includes spherical lens elements 509, 510 and 511. The second lens group 503 includes aperture stop 505 and two cemented doublets 512, 513 and 514, 515. Lens element 515 is made of athermal optical material. The third lens group 504 includes two lens elements 516 and 517. A filter 506 is shown in the design between the third lens group 504 and the image plane 507. In one embodiment the large aperture compact lens 501 of FIG. 5 consists solely of the lens elements as shown. In another embodiment additional lens elements may be added to the design. However, the lens 501, with just the lens elements 509-517, as shown, satisfies the parametric equation 2. A specific example of a lens made with the design of FIG. 5 is shown below as Example 5.

Figure 6:
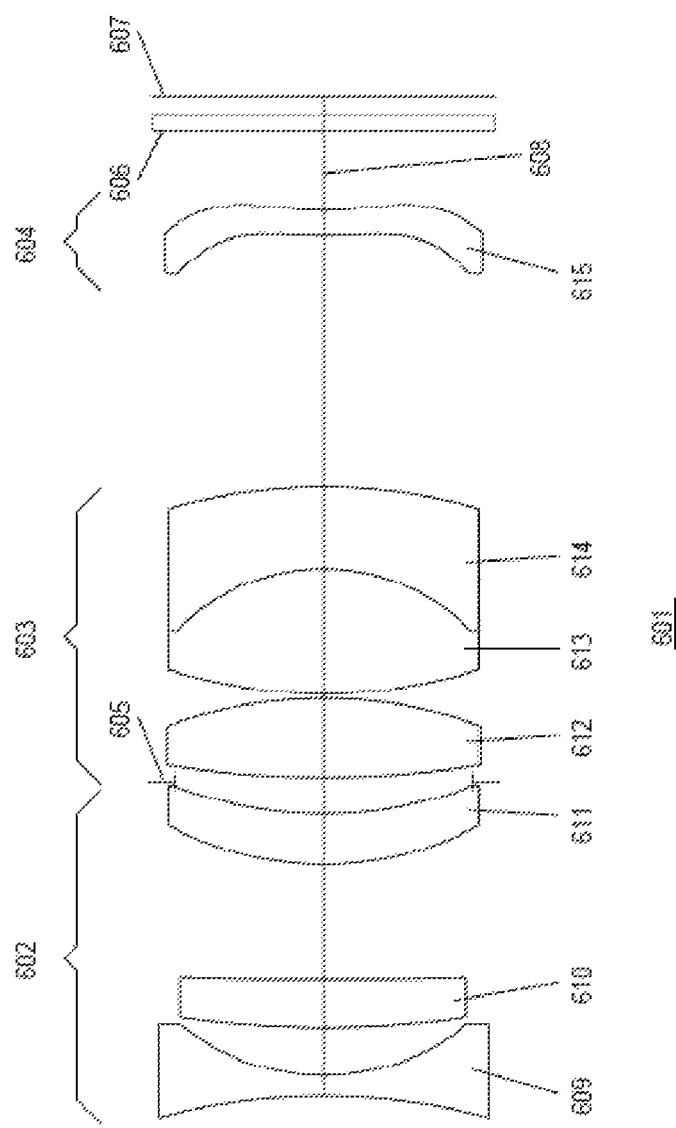
FIG. 6 is a diagram of a second large aperture compact lens having 7 lens elements.

FIG. 6 shows a large aperture compact lens design 601 that includes 7 optical elements 609-615, each aligned about and along the optical axis 208. This design has a field angle of 65 degrees with a relative aperture of F/1.8. The lens elements are divided into three lens groups. The first lens group 602 includes lens elements 609, 610 and 611 and all are spherical. The second lens group 603 includes aperture stop 605 and spherical lens elements including lens element 612 and a cemented doublet 613, 614. Lens element 612 is made from athermal optical material. The third lens group 604 includes aspheric lens element 615. Both surfaces (S13 and S14) are aspheric. A filter 606 is shown in the design between the third lens group 604 and the image plane 607. In one embodiment the large aperture compact lens 601 of FIG. 6 consists solely of the lens elements as shown. In another embodiment additional lens elements may be added to the design. However, the lens 601 with just the lens elements 609-614, as shown, satisfies the parametric equation 2. A specific example of a lens made with the design of FIG. 6 is shown below as Example 6.

Figure 7:
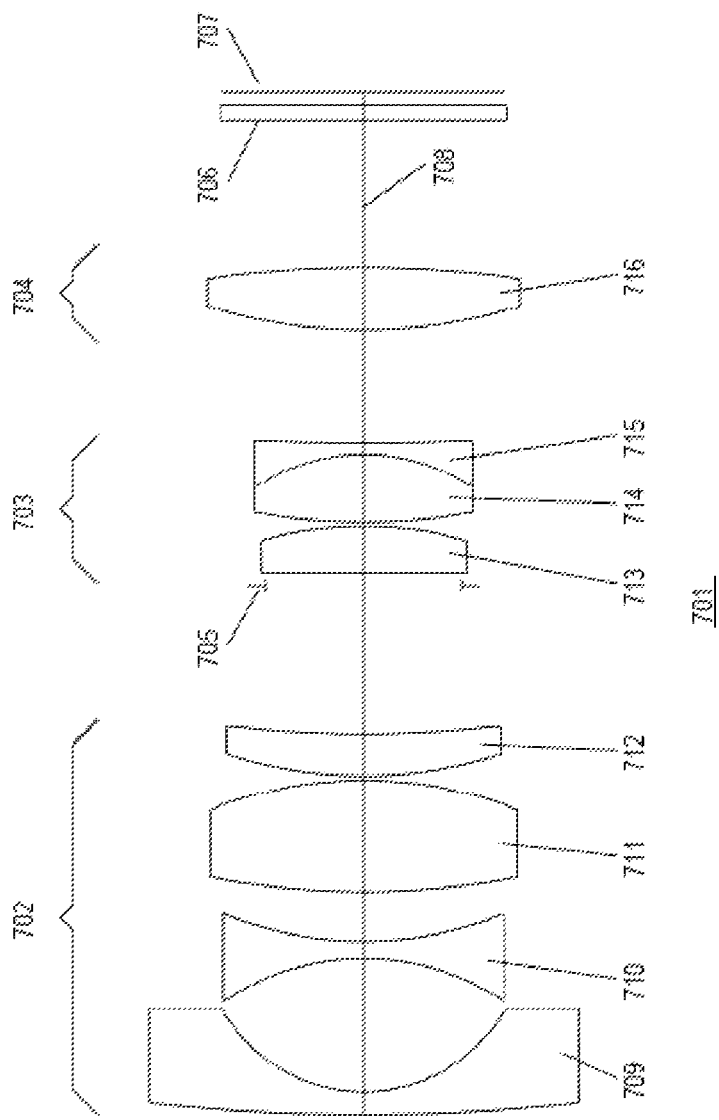
FIG. 7 is a diagram of a third large aperture compact lens having 8 lens elements.
Figure 8:
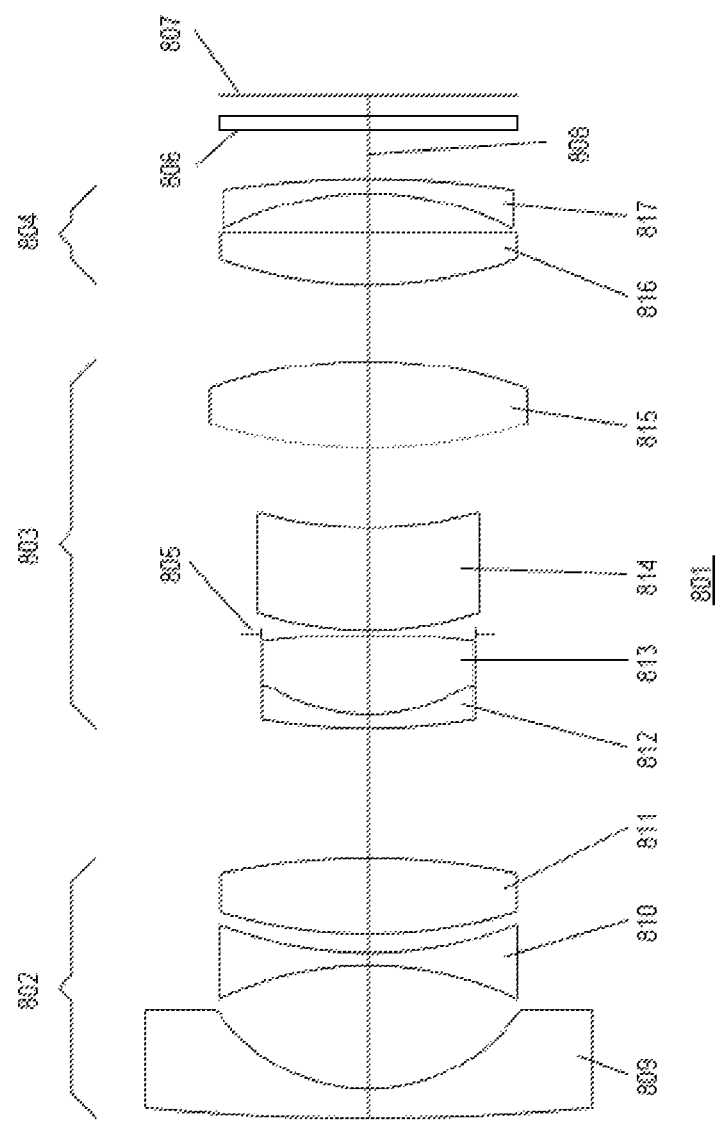
FIG. 8 is a diagram of a third large aperture compact lens having 9 lens elements.

FIG. 7 shows a large aperture compact lens design 701 that includes 8 optical elements 709-716, each centered on and precisely spaced along the optical axis 708. This design has a field angle of 118 degrees with a relative aperture of F/1.7. The lens elements are divided into three lens groups. The first lens group 302 includes spherical lens elements 709-712. The second lens group 703 includes aperture stop 705 and three spherical lens elements 713-715. Lens elements 714, 715 are a cemented doublet and lens element 713 is made from athermal optical material. The third lens group 704 and includes spherical lens element 716. A filter 706 is shown in the design between the third lens group 704 and the image plane 707. In one embodiment the large aperture compact lens 701 of FIG. 7 consists solely of the lens elements as shown. In another embodiment additional lens elements may be added to the design. However, the lens 701 with just the lens elements 709-716, as shown, satisfies the parametric equation 2. A specific example of a lens made with the design of FIG. 3 is shown below as Example 3. FIG. 8 shows a large aperture compact lens design 801 that includes 9 optical elements 809-817, each centered on and precisely spaced along the optical axis 808. This design has a field angle of 120 degrees with a relative aperture of F/1.6. The lens elements are divided into three lens groups. The first lens group 802 includes spherical lens elements 809-811. The second lens group 803 includes spherical cemented doublet 812,813, aperture stop 805, and lens element 815 which is made of athermal optical material. The third lens group 804 includes spherical lens elements 816-817. In one embodiment the large aperture compact lens 801 of FIG. 8 consists solely of the lens elements as shown.

In another embodiment additional lens elements may be added to the design. However, the lens 801, with just the lens elements 809-817, as shown, satisfies the parametric equation 2. A specific example of a lens made with the design of FIG. 8 is shown below as Example 8.

Figure 9:
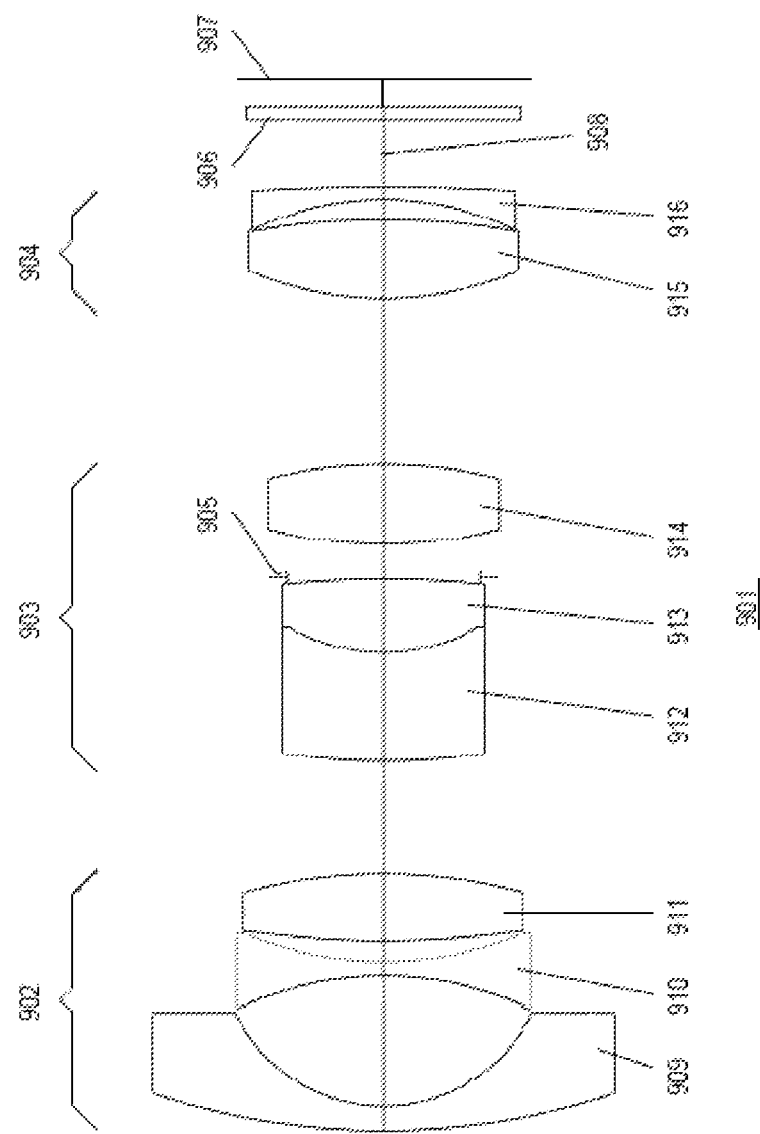
FIG. 9 is a diagram of a fourth large aperture compact lens having 8 lens elements.

FIG. 9 shows a large aperture compact lens design 901 that includes 8 optical elements 909-916, each centered on and precisely spaced along the optical axis 508. This design has a field angle of 141 degrees with a relative aperture of F/1.6. The lens elements are divided into three lens groups. The first lens group 902 includes spherical lens elements 909, 910 and 911. The second lens group 903 includes spherical cemented doublet 912, 913, aperture stop 905 and lens element 915. Lens element 915 is made of athermal optical material. The third lens group 904 includes two spherical lens elements 915 and 916. A filter 906 is shown in the design between the third lens group 904 and the image plane 907. In one embodiment the large aperture compact lens 901 of FIG. 9 consists solely of the lens elements as shown. In another embodiment additional lens elements may be added to the design. However, the lens 901, with just the lens elements 909-916, as shown, satisfies the parametric equation 2. A specific example of a lens made with the design of FIG. 9 is shown below as Example 9.

Figure 10:
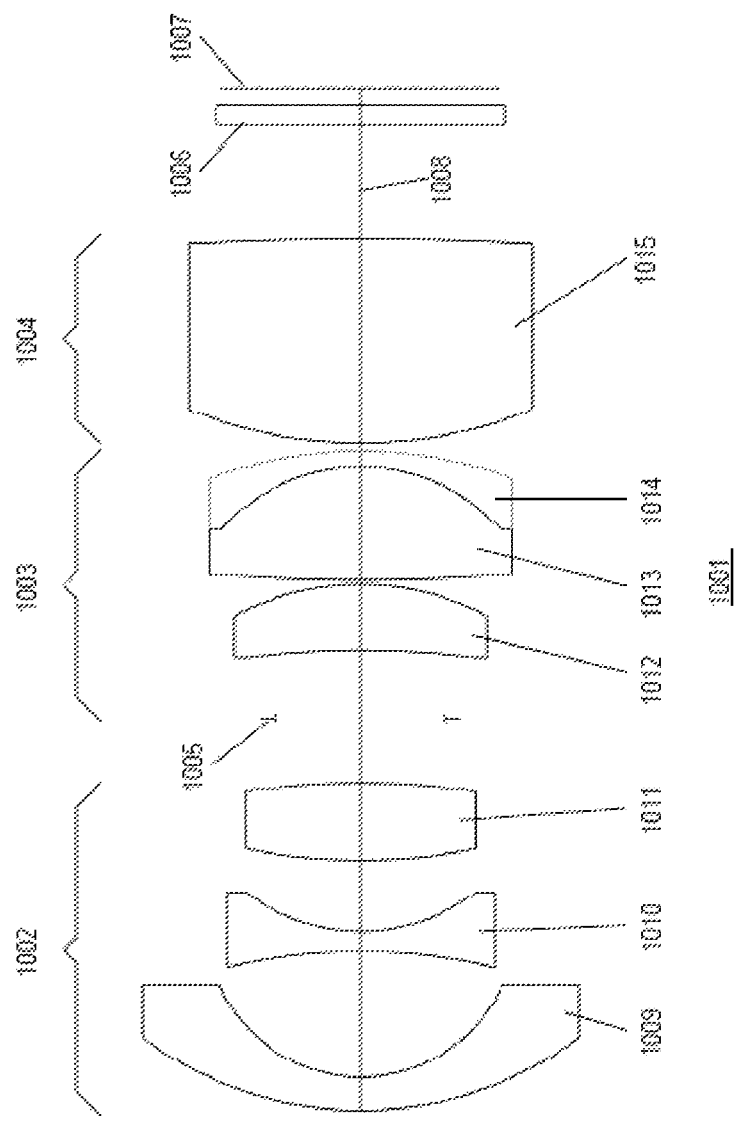
FIG. 10 is a diagram of a third large aperture compact lens having 7 lens elements.

FIG. 10 shows a large aperture compact lens design 301 that includes 7 optical elements 1009-1015, each centered on and precisely spaced along the optical axis 1008. This design has a field angle of 145 degrees with a relative aperture of F/1.6. The lens elements are divided into three lens groups. The first lens group 1002 includes spherical lens elements 1009-1011. The second lens group 1003 includes aperture stop 1005 and three spherical lens elements 1012-1014. Lens element 1012 is made from athermal optical material. The third lens group 1004 and includes spherical lens element 1015. A filter 1006 is shown in the design between the third lens group 1004 and the image plane 1007. In one embodiment the large aperture compact lens 1001 of FIG. 10 consists solely of the lens elements as shown. In another embodiment additional lens elements may be added to the design. However, the lens 1001 with just the lens elements 1009-1015, as shown, satisfies the parametric equation 2. A specific example of a lens made with the design of FIG. 10 is shown below as Example 10.

EXAMPLES

Ten specific examples satisfying the description of the invented large aperture compact lens follow. Each of the examples represent a large aperture compact lens with a field of view of 24° or greater, made according to the descriptions of FIGS. 1-10. All are comprised of three lens groups as described. All examples satisfy parametric equation 2.

Example 1

FIG. 1 shows the layout of Example 1. This design has a field angle of 24° with a relative aperture of F/1.6.

TABLE 1

The optical prescription of Example 1.

| Surf | Type | Radius | Thickness | Glass (Nd, Vd) | Comment |
|---|---|---|---|---|---|
| OBJ | STANDARD | Infinity | Infinity | | |
| 1 | STANDARD | 20.12048 | 2.274475 | 1.772501, 49.613485 | L1 |
| 2 | STANDARD | 81.23693 | 1.574959 | | |
| 3 | STANDARD | −26.48552 | 0.4973897 | 1.743305, 49.238028 | L2 |
| 4 | STANDARD | 118.5066 | 3.0236 | | |
| 5 | STANDARD | 65.352 | 2.629634 | 1.723418, 38.022035 | L3 |
| 6 | STANDARD | −27.79281 | 0.1481095 | | |
| STO | STANDARD | Infinity | 1.756527 | | |
| 8 | STANDARD | 18.12103 | 2.443995 | 1.497103, 81.559580 | L4 |
| 9 | STANDARD | −29.47411 | 4.954654 | 1.755205, 27.547441 | L5 |
| 10 | STANDARD | 12.00546 | 3.106823 | | |
| 11 | STANDARD | 24.48503 | 4.601733 | 1.883004, 40.806875 | L6 |
| 12 | STANDARD | −98.88115 | 0.09856437 | | |

TABLE 1-continued

The optical prescription of Example 1.

| Surf | Type | Radius | Thickness | Glass (Nd, Vd) | Comment |
|---|---|---|---|---|---|
| 13 | STANDARD | 11.11577 | 3.798899 | 1.883004, 40.806875 | L7 |
| 14 | STANDARD | 46.92872 | 0.5123952 | 1.620047, 36.347920 | L8 |
| 15 | STANDARD | 7.051055 | 6.64143 | | |
| 16 | STANDARD | Infinity | 0.4 | 1.516800, 64.167336 | Filter |
| 17 | STANDARD | Infinity | 0.5 | | |
| IMA | STANDARD | Infinity | | | |

Group 1 is L1, L2 and L3.
Group 2 is aperture stop, L4, L5, and L6. L4 is a positive lens element and is made from athermal optical material.
Group 3 is L7 and L8.

Example 2

FIG. 2 shows the layout of Example 2. This design has a field angle of 34° with a relative aperture of F/1.6.

TABLE 2

The optical prescription of Example 2.

| Surf | Type | Radius | Thickness | Glass (Nd, Vd) | Comment |
|---|---|---|---|---|---|
| OBJ | STANDARD | Infinity | Infinity | | |
| 1 | STANDARD | 12.97308 | 1.847098 | 1.953749, 32.318108 | L1 |
| 2 | STANDARD | 28.13573 | 0.1 | | |
| 3 | STANDARD | 8.923371 | 1.747881 | 1.804005, 46.590950 | L2 |
| 4 | STANDARD | 14.07497 | 0.2160873 | | |
| 5 | STANDARD | 17.07383 | 0.4 | 1.740770, 27.767880 | L3 |
| 6 | STANDARD | 5.738117 | 1.456088 | | |
| STO | STANDARD | Infinity | 2.419431 | | |
| 8 | STANDARD | −9.88504 | 2.291102 | 1.693631, 49.233011 | L4 |
| 9 | STANDARD | −4.86988 | 0.4 | 1.806105, 41.023451 | L5 |
| 10 | STANDARD | −15.898 | 0.1 | | |
| 11 | STANDARD | 24.06194 | 2.836542 | 1.592824, 68.624378 | L6 |
| 12 | STANDARD | −12.1398 | 1.648748 | | |
| 13 | STANDARD | 28.7113 | 3.416939 | 1.816001, 46.569210 | L7 |
| 14 | STANDARD | −11.0505 | 5 | 1.739999, 28.245048 | L8 |
| 15 | STANDARD | −26.0582 | 1.72286 | | |
| 16 | STANDARD | −9.35393 | 0.4 | 1.487491, 70.419640 | L9 |
| 17 | STANDARD | 38.67431 | 2.840213 | | |
| 18 | STANDARD | Infinity | 0.5 | 1.516797, 64.212351 | Filter |
| 19 | STANDARD | Infinity | 0.5 | | |
| IMA | STANDARD | Infinity | | | |

Group 1 is L1, L2 and L3
Group 2 is aperture stop, L4, L5, and L6. L6 is a positive lens element made from athermal optical material.
Group 3 is L7, L8 and L9

Example 3

FIG. 3 shows the layout of Example 3. This design has a field angle of 50° with a relative aperture of F/1.6.

TABLE 3A

The optical prescription of Example 3.

| Surf | Type | Radius | Thickness | Glass | Comment |
|---|---|---|---|---|---|
| OBJ | STANDARD | Infinity | Infinity | | |
| 1 | STANDARD | −15.6686 | 0.395822 | 1.581439, 40.749269 | L1 |
| 2 | STANDARD | 9.910623 | 4.303624 | | |
| 3 | STANDARD | 11.90586 | 2.769508 | 1.592824, 68.624378 | L2 |
| 4 | STANDARD | −24.9746 | 0.130688 | | |
| 5 | STANDARD | 10.82125 | 1.48182 | 1.953749, 32.318108 | L3 |
| 6 | STANDARD | 20.10535 | 0.711642 | | |
| STO | STANDARD | Infinity | 3.01757 | | |
| 8 | STANDARD | −11.1667 | 0.399438 | 1.672702, 32.178880 | L4 |

TABLE 3A-continued

The optical prescription of Example 3.

| Surf | Type | Radius | Thickness | Glass | Comment |
|---|---|---|---|---|---|
| 9 | STANDARD | 6.678261 | 2.729198 | 1.592824, 68.624378 | L5 |
| 10 | STANDARD | −20.3102 | 0.141971 | | |
| 11 | STANDARD | 9.859464 | 2.358575 | 1.804009, 46.567682 | L6 |
| 12 | STANDARD | −102.432 | 2.324044 | | |
| 13 | EVENASPH | 41.2906 | 0.837884 | 1.821145, 24.058306 | L7 |
| 14 | EVENASPH | 12.84194 | 5.899021 | | |
| IMA | STANDARD | Infinity | | | |

TABLE 3B

The aspherical coefficients
for the aspherical surfaces in Table 3A.

Surface 13 EVENASPH

| | |
|---|---|
| Coefficient on r ∧ 2: | 7.4422632e−11 |
| Coefficient on r ∧ 4: | −0.0039660909 |
| Coefficient on r ∧ 6: | 6.9456429e−05 |
| Coefficient on r ∧ 8: | 0 |
| Coefficient on r ∧ 10: | 0 |
| Coefficient on r ∧ 12: | 0 |
| Coefficient on r ∧ 14: | 0 |
| Coefficient on r ∧ 16: | 0 |

Surface 14 EVENASPH

| | |
|---|---|
| Coefficient on r ∧ 2: | 5.4232143e−10 |
| Coefficient on r ∧ 4: | −0.0036269528 |
| Coefficient on r ∧ 6: | 0.00010255971 |

TABLE 3B-continued

The aspherical coefficients
for the aspherical surfaces in Table 3A.

| | |
|---|---|
| Coefficient on r ∧ 8: | −1.2937068e−06 |
| Coefficient on r ∧ 10: | 0 |
| Coefficient on r ∧ 12: | 0 |
| Coefficient on r ∧ 14: | 0 |
| Coefficient on r ∧ 16: | 0 |

Group 1 is L1, L2 and L3
Group 2 is aperture stop, L4, L5, and L6
Group 3 is L7 which is an asphere.

Example 4

FIG. 4 shows the layout of Example 4. This design has a field angle of 56° with a relative aperture of F/1.6.

TABLE 4

The optical prescription of Example 4.

| Surf | Type | Radius | Thickness | Glass (Nd, Vd) | Comment |
|---|---|---|---|---|---|
| OBJ | STANDARD | Infinity | Infinity | | |
| 1 | STANDARD | −18.1792 | 0.703735 | 1.647693, 33.842283 | L1 |
| 2 | STANDARD | 8.820533 | 2.614537 | | |
| 3 | STANDARD | 13.79922 | 2.87687 | 1.804009, 46.567682 | L2 |
| 4 | STANDARD | −16.1922 | 0.2 | | |
| 5 | STANDARD | 7.73837 | 1.261873 | 2.000689, 25.435062 | L3 |
| 6 | STANDARD | 11.86276 | 0.455681 | 1.487491, 70.419640 | L4 |
| 7 | STANDARD | 5.321962 | 1.82717 | | |
| STO | STANDARD | Infinity | 2.657049 | | |
| 9 | STANDARD | −5.99218 | 0.687246 | 1.846666, 23.787324 | L5 |
| 10 | STANDARD | 15.15558 | 2.207565 | 1.592824, 68.624378 | L6 |
| 11 | STANDARD | −7.13687 | 0.075317 | | |
| 12 | STANDARD | 23.08853 | 2.586252 | 1.755002, 52.329298 | L7 |
| 13 | STANDARD | −15.5672 | 4.147514 | | |
| 14 | STANDARD | 13.59605 | 2.335931 | 1.953749, 32.318108 | L8 |
| 15 | STANDARD | 21.23552 | 5.636141 | | |
| IMA | STANDARD | Infinity | | | |

Group 1 is L1, L2, L3 and L4
Group 2 is aperture stop L5, L6 and L7
Group 3 is L8

Example 5

FIG. 5 shows the layout of Example 5. This design has a field angle of 74° with a relative aperture of F/1.6.

TABLE 5

The optical prescription of Example 5.

| Surf | Type | Radius | Thickness | Glass (Nd, Vd) | Comment |
|---|---|---|---|---|---|
| OBJ | STANDARD | Infinity | Infinity | | |
| 1 | STANDARD | −31.3709 | 0.39645 | 1.548141, 45.832966 | L1 |
| 2 | STANDARD | 6.830626 | 3.41969 | | |
| 3 | STANDARD | −7.44051 | 2.878004 | 2.000689, 25.435062 | L2 |
| 4 | STANDARD | −9.66468 | 0.098934 | | |
| 5 | STANDARD | 14.5726 | 2.272651 | 1.953749, 32.318108 | L3 |
| 6 | STANDARD | −98.1423 | 4.453996 | | |
| STO | STANDARD | Infinity | 0.755038 | | |
| 8 | STANDARD | 30.51999 | 2.371627 | 1.592824, 68.624378 | L4 |
| 9 | STANDARD | −8.00305 | 2.368226 | 2.000689, 25.435062 | L5 |
| 10 | STANDARD | −13.4055 | 0.091605 | | |
| 11 | STANDARD | 8.932485 | 2.857977 | 1.592824, 68.624378 | L6 |
| 12 | STANDARD | −10.5653 | 0.397322 | 1.846666, 23.787324 | L7 |
| 13 | STANDARD | 9.378114 | 3.437879 | | |
| 14 | STANDARD | −6.05945 | 0.773091 | 1.516797, 64.212351 | L8 |
| 15 | STANDARD | −8.26488 | 0.098687 | | |
| 16 | STANDARD | 20.71668 | 2.342451 | 2.000689, 25.435062 | L9 |
| 17 | STANDARD | −24.7493 | 4.990002 | | |
| 18 | STANDARD | Infinity | 0.5 | 1.516797, 64.212351 | Filter |
| 19 | STANDARD | Infinity | 0.5 | | |
| IMA | STANDARD | Infinity | | | |

Group 1 is L1, L2 and L3
Group 2 is aperture stop, L4, L5, L6 and L7
Group 3 is L8 and L9.

Example 6

FIG. 6 shows the layout of Example 6. This design has a field angle of 65° with a relative aperture of F/1.8.

TABLE 6A

The optical prescription of Example 6.

| Surf | Type | Radius | Thickness | Glass (Nd, Vd) | Comment |
|---|---|---|---|---|---|
| OBJ | STANDARD | Infinity | Infinity | | |
| 1 | STANDARD | −15.8809 | 0.5 | 1.531722, 48.851958 | L1 |
| 2 | STANDARD | 5.620943 | 1.187255 | | |
| 3 | EVENASPH | 29.65893 | 1.208295 | 1.534636, 56.196755 | L2 |
| 4 | EVENASPH | −922.036 | 2.875425 | | |
| 5 | STANDARD | 8.061651 | 1.26773 | 1.945958, 17.943914 | L3 |
| 6 | STANDARD | 10.08926 | 0.811162 | | |
| STO | STANDARD | Infinity | 0.096569 | | |
| 8 | STANDARD | 24.57599 | 1.979937 | 1.592824, 68.624378 | L4 |
| 9 | STANDARD | −11.4705 | 0.126573 | | |
| 10 | STANDARD | 12.85226 | 3.113809 | 1.592824, 68.624378 | L5 |
| 11 | STANDARD | −5.12659 | 2.035025 | 1.846666, 23.787324 | L6 |
| 12 | STANDARD | −14.2965 | 6.30599 | | |
| 13 | EVENASPH | 14.04556 | 0.626974 | 1.534636, 56.196755 | L7 |
| 14 | EVENASPH | 7.344781 | 1.973478 | | |
| 15 | STANDARD | Infinity | 0.4 | 1.516797, 64.212351 | Filter |
| 16 | STANDARD | Infinity | 0.5 | | |
| IMA | STANDARD | Infinity | | | |

TABLE 6B

The aspherical coefficients for
the aspherical surfaces in Table 6A.

Surface 3 EVENASPH

| | |
|---|---|
| Coefficient on r ∧ 2: | 0 |
| Coefficient on r ∧ 4: | 0.00050053443 |
| Coefficient on r ∧ 6: | −2.0285099e−05 |
| Coefficient on r ∧ 8: | 0 |
| Coefficient on r ∧ 10: | 0 |
| Coefficient on r ∧ 12: | 0 |
| Coefficient on r ∧ 14: | 0 |
| Coefficient on r ∧ 16: | 0 |

Surface 4 EVENASPH Fictitious

| | |
|---|---|
| Coefficient on r ∧ 2: | 0 |
| Coefficient on r ∧ 4: | 0.00061437944 |
| Coefficient on r ∧ 6: | −2.299053e−05 |
| Coefficient on r ∧ 8: | 0 |
| Coefficient on r ∧ 10: | 0 |
| Coefficient on r ∧ 12: | 0 |
| Coefficient on r ∧ 14: | 0 |
| Coefficient on r ∧ 16: | 0 |

Surface 13 EVENASPH

| | |
|---|---|
| Coefficient on r ∧ 2: | 0 |
| Coefficient on r ∧ 4: | −0.010175865 |
| Coefficient on r ∧ 6: | 0.00013637253 |

TABLE 6B-continued

The aspherical coefficients for
the aspherical surfaces in Table 6A.

| | |
|---|---|
| Coefficient on r ∧ 8: | 0 |
| Coefficient on r ∧ 10: | 0 |
| Coefficient on r ∧ 12: | 0 |
| Coefficient on r ∧ 14: | 0 |
| Coefficient on r ∧ 16: | 0 |

Surface 14 EVENASPH

| | |
|---|---|
| Coefficient on r ∧ 2: | 0 |
| Coefficient on r ∧ 4: | −0.0098625323 |
| Coefficient on r ∧ 6: | 0.00021405164 |
| Coefficient on r ∧ 8: | −2.2928872e−06 |
| Coefficient on r ∧ 10: | 0 |
| Coefficient on r ∧ 12: | 0 |
| Coefficient on r ∧ 14: | 0 |
| Coefficient on r ∧ 16: | 0 |

Group 1 is L1, L2 (asphere) and L3
Group 2 is aperture stop, L4, L5, and L6
Group 3 is L7 (asphere).

Example 7

FIG. 7 shows the layout of Example 7. This design has a field angle of 118° with a relative aperture of F/1.7.

TABLE 7

The optical prescription of Example 7.

| Surf | Type | Radius | Thickness | Glass (Nd, Vd) | Comment |
|---|---|---|---|---|---|
| OBJ | STANDARD | Infinity | Infinity | | |
| 1 | STANDARD | 68.90706 | 0.745859 | 1.516797, 64.212351 | L1 |
| 2 | STANDARD | 5.518771 | 4.54386 | | |
| 3 | STANDARD | −8.72449 | 0.622441 | 1.568832, 56.059608 | L2 |
| 4 | STANDARD | 12.64086 | 1.705875 | | |
| 5 | STANDARD | 27.51346 | 3.803304 | 1.910826, 35.255728 | L3 |
| 6 | STANDARD | −14.1639 | 0.153261 | | |
| 7 | STANDARD | 15.35239 | 1.451882 | 1.834810, 42.727483 | L4 |
| 8 | STANDARD | 36.93503 | 5.033695 | | |
| STO | STANDARD | Infinity | 0.493853 | | |
| 10 | STANDARD | Infinity | 1.551161 | 1.696800, 55.534184 | L5 |
| 11 | STANDARD | −12.906 | 0.192379 | | |
| 12 | STANDARD | 20.5896 | 2.297528 | 1.592824, 68.624378 | L6 |
| 13 | STANDARD | −6.51911 | 0.3927 | 1.945958, 17.943914 | L7 |
| 14 | STANDARD | 89.24285 | 3.861089 | | |
| 15 | STANDARD | 17.90063 | 2.123665 | 1.945958, 17.943914 | L8 |
| 16 | STANDARD | −38.0414 | 5.064079 | | |
| 17 | STANDARD | Infinity | 0.5 | 1.516797, 64.212351 | Filter |
| 18 | STANDARD | Infinity | 0.5 | | |
| IMA | STANDARD | Infinity | | | |

Group 1 is L1, L2, L3 and L4
Group 2 is aperture stop, L5, L6, and L7
Group 3 is L8

Example 8

FIG. 8 shows the layout of Example 8. This design has a field angle of 120° with a relative aperture of F/1.6.

TABLE 8

The optical prescription of Example 8.

| Surf | Type | Radius | Thickness | Glass (Nd, Vd) | Comment |
|---|---|---|---|---|---|
| OBJ | STANDARD | Infinity | Infinity | | |
| 1 | STANDARD | 74.26639 | 0.8 | 1.617998, 63.405767 | L1 |
| 2 | STANDARD | 5.313839 | 3.473529 | | |
| 3 | STANDARD | −10.1228 | 0.4 | 1.589128, 61.247611 | L2 |

TABLE 8-continued

The optical prescription of Example 8.

| Surf | Type | Radius | Thickness | Glass (Nd, Vd) | Comment |
|---|---|---|---|---|---|
| 4 | STANDARD | 11.80588 | 0.516171 | | |
| 5 | STANDARD | 14.97398 | 2.132913 | 2.000689, 25.435062 | L3 |
| 6 | STANDARD | −20.5173 | 3.692096 | | |
| 7 | STANDARD | 17.5156 | 0.4 | 1.922866, 20.882149 | L4 |
| 8 | STANDARD | 5.526837 | 2.244747 | 1.592824, 68.624378 | L5 |
| 9 | STANDARD | −23.9067 | 0.046538 | | |
| STO | STANDARD | Infinity | 0.09734 | | |
| 11 | STANDARD | 10.37297 | 2.920095 | 1.834810, 42.727483 | L6 |
| 12 | STANDARD | 11.79136 | 2.245143 | | |
| 13 | STANDARD | 15.50236 | 2.449629 | 1.787998, 47.516598 | L7 |
| 14 | STANDARD | −13.419 | 2.160441 | | |
| 15 | STANDARD | 12.74507 | 1.491003 | 1.755002, 52.329298 | L8 |
| 16 | STANDARD | Infinity | 1.098792 | | |
| 17 | STANDARD | −8.78315 | 0.4 | 1.945958, 17.943914 | L9 |
| 18 | STANDARD | −28.5508 | 2.405295 | | |
| 19 | STANDARD | Infinity | 0.5 | 1.516797, 64.212351 | Filter |
| 20 | STANDARD | Infinity | 0.53 | | |
| IMA | STANDARD | Infinity | | | |

Group 1 is L1, L2 and L3
Group 2 is L4, L5, aperture stop, L6 and L7
Group 3 is L8 and L9

Example 9

FIG. 9 shows the layout of Example 9. This design has a field angle of 141° with a relative aperture of F/1.6.

TABLE 9

The optical prescription of Example 9.

| Surf | Type | Radius | Thickness | Glass (Nd, Vd) | Comment |
|---|---|---|---|---|---|
| OBJ | STANDARD | Infinity | Infinity | | |
| 1 | STANDARD | 25.12889 | 0.800381 | 1.729164, 54.669031 | L1 |
| 2 | STANDARD | 5.535265 | 4.300522 | | |
| 3 | STANDARD | −11.88645 | 0.500263 | 1.620412, 60.373876 | L2 |
| 4 | STANDARD | 11.88645 | 0.697701 | | |
| 5 | STANDARD | 32.37312 | 2.237877 | 2.000689, 25.435062 | L3 |
| 6 | STANDARD | −18.03447 | 3.80937 | | |
| 7 | STANDARD | 23.35081 | 3.6449 | 1.922866, 20.882149 | L4 |
| 8 | STANDARD | 6.238156 | 2.494347 | 1.592824, 68.624378 | L5 |
| 9 | STANDARD | −32.6334 | 0.063609 | | |
| STO | STANDARD | Infinity | 1.096333 | | |
| 11 | STANDARD | 15.54216 | 2.691568 | 1.834810, 42.727483 | L6 |
| 12 | STANDARD | −15.54216 | 5.564714 | | |
| 13 | STANDARD | 11.41917 | 2.644195 | 1.755002, 52.329298 | L7 |
| 14 | STANDARD | −26.05288 | 0.693529 | | |
| 15 | STANDARD | −9.773582 | 0.400204 | 1.945958, 17.943914 | L8 |
| 16 | STANDARD | −75.06755 | 2.250361 | | |
| 17 | STANDARD | Infinity | 0.5 | 1.516797, 64.212351 | Filter |
| 18 | STANDARD | Infinity | 0.450878 | | |
| IMA | STANDARD | Infinity | | | |

Group 1 is L1, L2 and L3
Group 2 is L4, L5, aperture stop and L6
Group 3 is L7 and L8

Example 10

FIG. 10 shows the layout of Example 10. This design has a field angle of 145° with a relative aperture of F/1.6.

TABLE 10

The optical prescription of Example 10.

| Surf | Type | Radius | Thickness | Glass (Nd, Vd) | Comment |
|---|---|---|---|---|---|
| OBJ | STANDARD | Infinity | Infinity | | |
| 1 | STANDARD | 8.938002 | 0.8 | 1.900696, 37.053564 | L1 |
| 2 | STANDARD | 3.755159 | 3.064666 | | |
| 3 | STANDARD | −13.6477 | 0.5 | 1.456500, 90.269745 | L2 |
| 4 | STANDARD | 4.585813 | 1.720552 | | |
| 5 | STANDARD | 13.8554 | 1.912088 | 2.003307, 28.317370 | L3 |
| 6 | STANDARD | −17.7944 | 1.56259 | | |
| STO | STANDARD | Infinity | 1.668173 | | |
| 8 | STANDARD | −21.7144 | 1.615539 | 1.592824, 68.624378 | L4 |
| 9 | STANDARD | −6.58352 | 0.1 | | |
| 10 | STANDARD | 43.75683 | 2.775322 | 1.592824, 68.624378 | L5 |
| 11 | STANDARD | −4.53616 | 0.398377 | 1.945958, 17.943914 | L6 |
| 12 | STANDARD | −10.2257 | 0.187981 | | |
| 13 | STANDARD | 11.15953 | 5.000438 | 1.883001, 40.867939 | L7 |
| 14 | STANDARD | −78.2502 | 2.797402 | | |
| 15 | STANDARD | Infinity | 0.45 | 1.516802, 64.230624 | Filter |
| 16 | STANDARD | Infinity | 0.45 | | |
| IMA | STANDARD | Infinity | | | |

Group 1 is L1, L2 and L3
Group 2 is aperture stop, L4, L5, and L6
Group 3 is L7.

Summary

All of the examples satisfy the conditions:
1) Group 1 has negative or positive power comprising 3-4 elements.
2) Group 2 has positive power comprising 3-4 elements. The aperture stop is either adjacent to this group or embedded in this group. This group comprises at least one cemented doublet. At least one of the positive powered elements in this group is made from a material having a negative dn/dT over the operating temperature range, where n is the index of refraction of the material at d-line, and T is the temperature of the environment. Such material is known as "athermal optical material".
3) Group 3 comprises of 1 to 3 elements.
4) $2.8 < TTL/(ImageHeight*2) < 4.12$
   Where TTL is the total track length defined as the distance from the front element vertex to the image plane when focused at infinity. ImageHeight is the chief ray height on the image plane at d-line.

One or more elements in Group 1 and 3 may be an aspherical element.

A summary of the 10 examples is included in the following table:

|  | Example1 | Example2 | Example3 | Example4 | Example5 |
|---|---|---|---|---|---|
| Total Track length (to image plane) | 39 | 30 | 27.5 | 30 | 35 |
| ImageHeight | 4.847 | 4.9 | 4.321 | 4.41 | 4.849 |
| TTL/(2 * ImageHeight) | 4.02 | 3.06 | 3.18 | 3.40 | 3.61 |
| Effective focal length of Group 1 | >0 | <0 | >0 | >0 | <0 |

|  | Example6 | Example7 | Example8 | Example9 | Example10 |
|---|---|---|---|---|---|
| Total Track length (to image plane) | 25 | 35 | 30 | 35 | 25 |
| ImageHeight | 4.312 | 4.863 | 4.3 | 4.624 | 3.43 |
| TTL/(2 * ImageHeight) | 2.90 | 3.60 | 3.49 | 3.78 | 3.64 |
| Effective focal length of Group 1 | <0 | <0 | <0 | <0 | <0 |

A Camera

Figure 11:
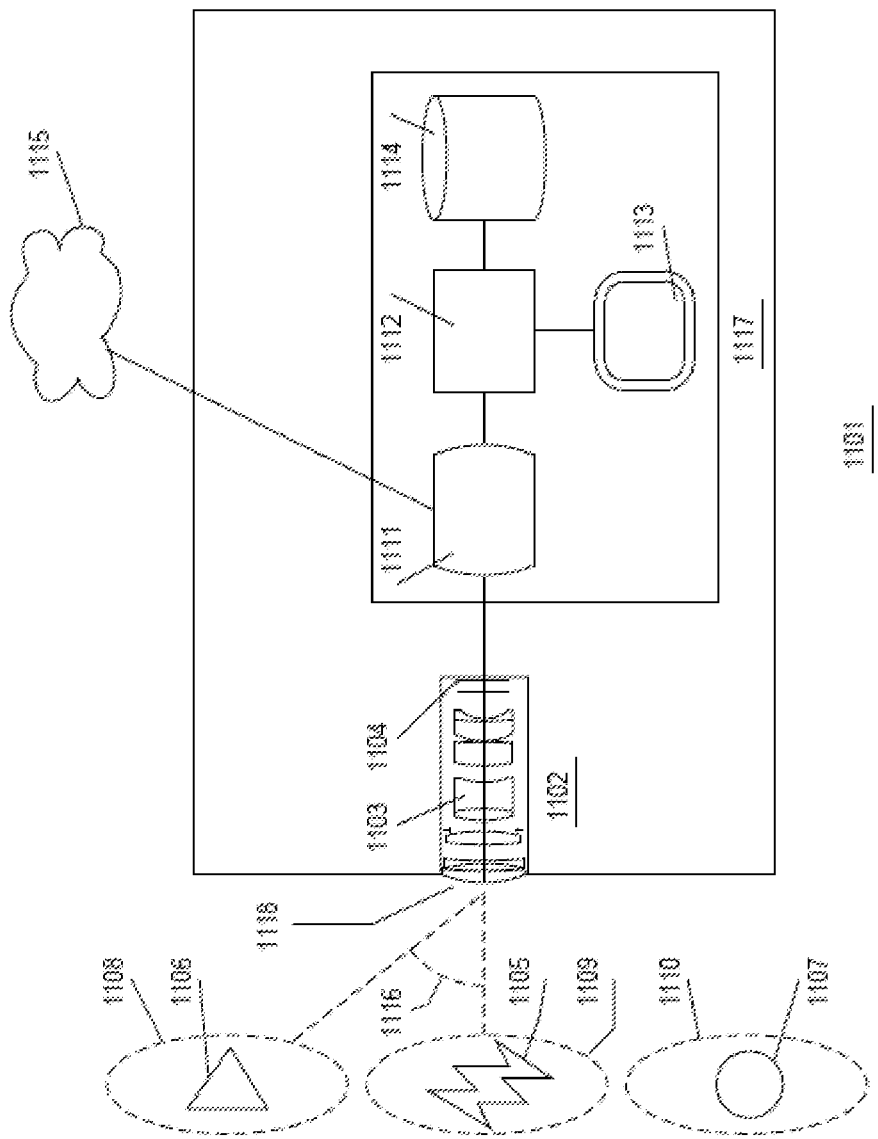
FIG. 11 is a diagram of a camera using any of the lens designs of FIGS. 1-10.

In another embodiment any of the described lens embodiments shown in FIGS. 1-10 is selected for inclusion in a camera system. The camera system is suitable for automotive, surveillance and any other application that benefits from the design parameters, especially that of higher magnification for objects nearer the optical axis. Referring now to FIG. 11, a camera 1101 is comprised of a lens 1102 and a computing device 1117. In one embodiment the lens is a large aperture compact lens comprising from object to image, three lens groups with a first lens group having a negative or positive power and comprising 3-4 lens elements, a second lens group having positive power and 3-4 elements including an aperture stop, at least one cemented doublet and one positive power lens made from athermic optical material, and a third lens group comprising 1-3 elements wherein the lens 1102 satisfies the parametric equation 2. In another embodiment, the lens 1102 is one selected from those described in FIGS. 1-10. Within the lens 1102 are lens elements as already described and an image sensor 1104 located at the image plane of the lens system. The lens is fitted to an aperture 1118 in the camera 1101 and receives light from objects 1105, 1106, 1107. The objects are located in regions 1108, 1109, 1110 arrayed at varying angles 1116 from the optical axis of the lens system. The camera further includes a computing device 1117. The computing device includes a processor 1112 that is connected to an input/output 1111 that receives data from the image sensor and in one embodiment can also transmit data externally from the processor such as through wired or wireless means to a network 1115, the network including a local area network, a wide area network and the Internet. The input/output device includes an analog to digital converter to accept analog data from the image sensor 1104 and store the data digitally within the computing device. In another embodiment the analog to digital converter is incorporated into the image sensor 1104 such that digital data is sent from the image sensor 1104 to the computing device 1117. The computing device further includes a user interface 1113 that enables a user to interact with the camera in ways such as pushing a button to trigger data acquisition and ins some embodiments to enter parameters related to the image data acquisition. In one embodiment the camera includes a shutter (not shown) located on the object side of the image sensor 1104. In another embodiment the camera is shutterless. The computing device further includes memory 1114. The memory is used to store image data. In another embodiment the memory further includes program instructions that control the processor 1112 for both image data acquisition, processing and storage of the acquired image data and transmission of data or processing results through the I/O 1111 to an external network. In one embodiment the camera 1101 is incorporated in a vehicle such as a car or a truck, airplane, and, drone and is used for guidance of the vehicle. In another embodiment the camera 1101 is incorporated in a surveillance device.

Summary

Large aperture compact lens and a camera design using the lens are described. The lens comprises from object to image, three lens groups with a first lens group having a negative or positive power and comprising 3-4 lens elements, a second lens group having positive power and 3-4 elements including an aperture stop, at least one cemented doublet and one positive power lens made from athermic optical material, and a third lens group comprising 1-3 elements.

I claim:

1. An optical lens comprising, from object to image, three lens groups, Group 1, Group 2 and Group 3, and,
   a. Group 1 has negative or positive power comprising 3-4 elements, and,
   b. Group 2 has positive power comprising 3-4 elements, and, the aperture stop is either adjacent to this group or embedded in this group, and, the Group 2 comprises at least one cemented doublet, and, at least one positive powered element in Group 2 is made from a material having a negative dn/dT over an operating temperature range, where n is the index of refraction of the material at d-line, and T is the temperature of the environment, and,
   c. Group 3 comprises 1 to 3 elements.

2. The optical lens of claim 1 wherein, at least one element of Group 1 or 3 is an aspherical element.

3. The optical lens of claim 1 satisfying:

$$2.8 < TTL/(ImageHeight*2) < 4.12$$

where TTL is the total track length defined as the distance from a front element in Group 1 vertex to an image plane when focused at infinity and ImageHeight is the chief ray height on the image plane at d-line.

4. The optical lens of claim 2 wherein the at least one positive powered element in Group 2 made from a material having a negative dn/dT is part of the cemented doublet.

5. An optical lens comprising, from object to image, three lens groups, Group 1, Group 2 and Group 3, and,
   a. Group 1 has negative power comprising 3-4 elements, and,
   b. Group 2 has positive power comprising 3-4 elements, and, the aperture stop is either adjacent to this group or embedded in this group, and, the Group 2 comprises at least one cemented doublet, and, at least one positive powered element in Group 2 is made from a material having a negative dn/dT over an operating temperature range, where n is the index of refraction of the material at d-line, and T is the temperature of the environment, and,
   c. Group 3 comprises 1 to 3 elements.

6. The optical lens of claim 5 wherein, at least one element of Group 1 or 3 is an aspherical element.

7. The optical lens of claim 5 satisfying:

$$2.8 < TTL/(ImageHeight*2) < 4.12$$

where TTL is the total track length defined as the distance from a front element in Group 1 vertex to an image plane when focused at infinity and ImageHeight is the chief ray height on the image plane at d-line.

8. The optical lens of claim 6 wherein the at least one positive powered element in Group 2 made from a material having a negative dn/dT is part of the cemented doublet.

9. An optical lens comprising, from object to image, three lens groups, Group 1, Group 2 and Group 3, and,
   a. Group 1 has positive power comprising 3-4 elements, and,
   b. Group 2 has positive power comprising 3-4 elements, and, the aperture stop is either adjacent to this group or embedded in this group, and, the Group 2 comprises at least one cemented doublet, and, at least one positive powered element in Group 2 is made from a material having a negative dn/dT over an operating temperature range, where n is the index of refraction of the material at d-line, and T is the temperature of the environment, and,
   c. Group 3 comprises 1 to 3 elements.

10. The optical lens of claim 9 wherein, at least one element of Group 1 or 3 is an aspherical element.

11. The optical lens of claim 9 satisfying:

$$2.8 < TTL/(ImageHeight*2) < 4.12 \qquad 5$$

where TTL is the total track length defined as the distance from a front element in Group 1 vertex to an image plane when focused at infinity and ImageHeight is the chief ray height on the image plane at d-line.

12. The optical lens of claim 10 wherein the at least one positive powered element in Group 2 made from a material having a negative dn/dT is part of the cemented doublet.

13. A camera comprising:
  a. An optical lens having an image plane and comprising, from object to image, three lens groups, Group 1, Group 2 and Group 3, and,
   i. Group 1 has negative or positive power comprising 3-4 elements, and,
   ii. Group 2 has positive power comprising 3-4 elements, and, the aperture stop is either adjacent to this group or embedded in this group, and, the Group 2 comprises at least one cemented doublet, and, at least one positive powered element in Group 2 is made from a material having a negative dn/dT over an operating temperature range, where n is the index of refraction of the material at d-line, and T is the temperature of the environment, and,
   iii. Group 3 comprises 1 to 3 elements,
  b. an image sensor located at the image plane of the lens system, and,
  c. a computing device that is connected to an input/output device that receives image data from the image sensor and transmits the image data from the computing device to a network, the network at least one selected from: a local area network, a wide area network and the Internet, and, the input/output device includes an analog to digital converter to accept analog data from the image sensor and store the data digitally within the computing device.

\* \* \* \* \*